March 29, 1960  H. E. LUEBKEMANN  2,930,168
MACHINE TOOL TAILSTOCK
Filed Jan. 26, 1959  2 Sheets-Sheet 1

INVENTOR.
HARRY E. LUEBKEMANN
BY
ATTORNEYS.

INVENTOR.
HARRY E. LUEBKEMANN.
ATTORNEYS.

2,930,168
MACHINE TOOL TAILSTOCK

Harry E. Luebkemann, Cincinnati, Ohio, assignor to The Cincinnati Milling Machine Co., Cincinnati, Ohio, a corporation of Ohio Application January 26, 1959, Serial No. 789,057

5 Claims. (Cl. 51—165)

The present invention relates to a tailstock for a machine tool.

In machining a workpiece supported between centers to a cylindrical conformation it is important that the centers lie on a line parallel to the direction of relative traversing movement between the work piece and the cutting element and, in a grinding machine, on a line parallel to the cutting surface of the grinding wheel. If this relationship between the centers is not maintained, a taper will be produced on the workpiece.

In many machine tools the headstock is immovably attached to the base of the machine while the tailstock is mounted on ways for movement towards and away from the headstock to accommodate workpieces of different sizes. Over a period of time the wear resulting from the movement of the tailstock can cause the center thereof to shift relative to the headstock center.

In order to compensate for wear of this nature, or to compensate for any inaccuracies in the manufacture of the tailstock which would produce a misalignment of the center thereof with the headstock center, the tailstock of the present invention has a center which is universally adjustable laterally in a plane normal to the axis of the headstock center.

In brief, this is accomplished by providing in the tailstock of the present invention an oversize elongated cavity opposite the headstock center to receive the spindle which supports the tailstock center. Because of the size of the cavity the spindle is shiftable laterally therein in all directions normal to the axis of the headstock center. Adjustable bearing members are provided to adjustably position the spindle on a selected axis within the cavity coincident with the axis of the headstock center. If wear on the tailstock or ways causes the tailstock center to gradually shift out of alignment with the headstock center, the spindle can be quickly and easily shifted within the oversize cavity to bring the tailstock center back into proper alignment with the headstock center.

It is therefore an object of the present invention to provide a tailstock for a machine tool having an adjustable center to eliminate the production of a taper on the workpieces.

It is another object of the present invention to provide a tailstock for a machine tool having a center universally adjustable in a plane normal to the axis of the headstock center.

It is yet another object of the present invention to provide a simple, sturdy tailstock having an easily adjusted center.

Figures 1, 2:
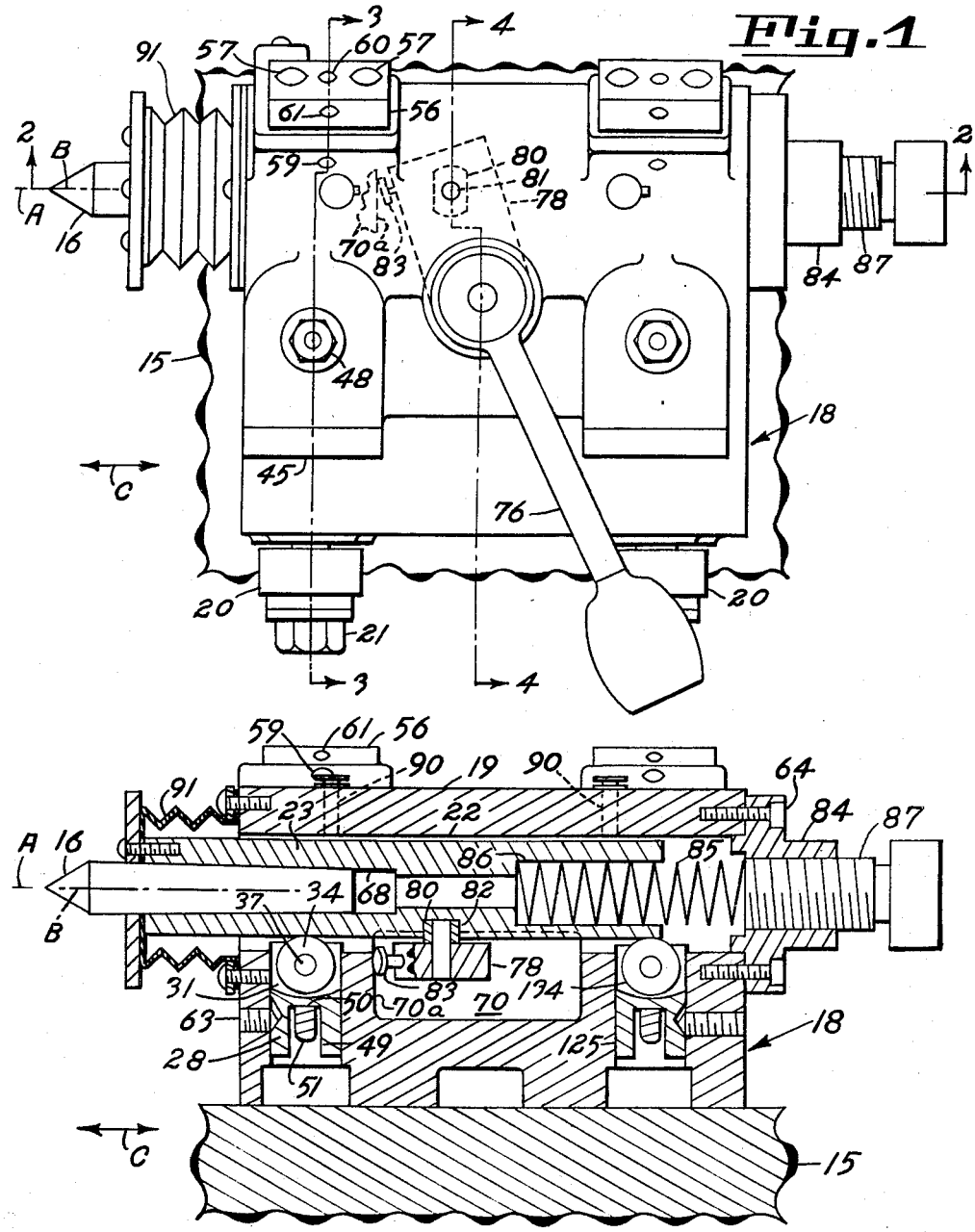
Fig. 1 is a top plan view of the tailstock of the present invention.
Fig. 2 is a sectional view taken on line 2—2 of Fig. 1.
Figure 3:
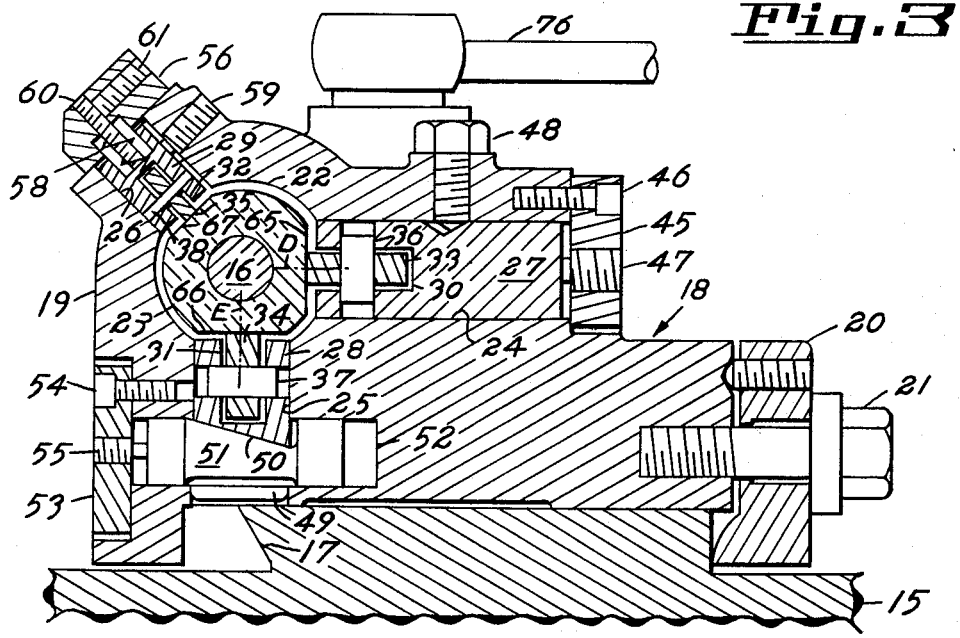
Fig. 3 is a sectional view taken on line 3—3 of Fig. 1.
Figure 4:
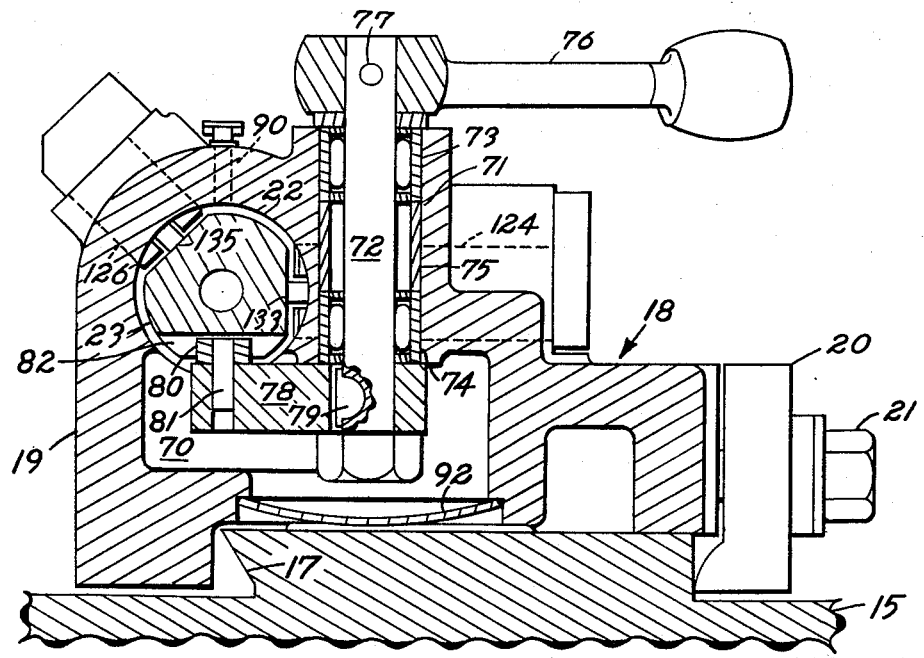
Fig. 4 is a sectional view taken on line 4—4 of Fig. 1.

The tailstock of the present invention may be mounted on the reciprocating table 15 of a grinding machine, such as the one shown in U.S. Patent 2,802,312 dated August 13, 1957, on which a headstock (not shown) is immovably mounted. The table traverses a workpiece supported between the headstock center (not shown) lying on axis A and tailstock center 16 lying on axis B relative to a grinding wheel (not shown) in the direction indicated by arrow C in Figs. 1 and 2. The table 15 has ways 17 (see Figs. 3 and 4) extending parallel to axis A and parallel to the traversing direction and the cutting surface of the grinding wheel, and the tailstock, indicated generally at 18, is movable on these ways towards and away from the headstock workpiece supporting center to accommodate workpieces of different lengths.

The tailstock body 19 has clamps 20, connected thereto at one side by bolts 21, to secure the tailstock in a fixed position on the ways 17. The body 19 has an elongated cavity, or bore, 22, extending parallel to axis A and opposite the headstock workpiece supporting center, which loosely receives the elongated spindle 23. The spindle 23, being of smaller cross-sectional size than the cross-sectional area of the over-size bore 22, is movable laterally therein in all directions in a plane normal to axis A.

A set of openings 24, 25, and 26 are located in the body 19 near the forward end thereof, circumferentially spaced around the bore 22 and in communication therewith. The openings, which are of circular cross-section, each slidably receive a cylindrical bearing member 27, 28, and 29, respectively, therein. The bearing member 27 at its inner end has a slot 30 in which is received roller 33 rotatably mounted therein on pin 36. Bearing member 28 has a similar slot 31 receiving roller 34 mounted on pin 37 and bearing member 29 also has a slot 32 receiving roller 35 mounted on pin 38. Opening 24 is located on one side of bore 22 on horizontal axis D passing through the center of the bore; opening 25 is located below bore 22 on vertical axis E passing through the center of the bore; and opening 26 is located opposite the other openings of the set, equally spaced from said other openings.

Opening 24 has a cap 45 over its outer end, secured to body 19 by bolts 46, and having set screw 47 therein. The bearing member 27 can be adjusted axially by set screw 47 which engages that member so that roller 33 will extend into bore 22 a desired amount. The bearing member 27 is locked in its adjusted position by set screw 48. The bearing member 28 has at its outer or lower end a slot 49 having a sloping surface 50, with which a wedge 51 is engaged. The wedge 51 slides in a bore 52 intersecting opening 25, the bore 52 having a cap 53 over one end thereof. The cap, which is connected to body 19 by bolts 54, has a set screw 55 therein engaged with the wedge 51 by which the position of the wedge can be adjusted. The position of the wedge establishes the position of bearing member 28, and the roller thereof may therefore be moved into bore 22 a desired amount. The bearing member 28 is locked in adjusted position by set screw 63. The opening 26 has over its outer end a block 56 connected to body 19 by bolts 57. A spring 58, interposed between block 56 and bearing member 29, renders the roller 35, which extends into bore 22, yieldable. The bearing member 29 is keyed in body 19 by screw 59 and can be held against yielding by screw 60, which is threadedly engaged in block 56 and adjustable to engage the bearing member 29. The set screw 61 holds the adjustable screw 60 in its adjusted position.

A similar set of openings 124, 125, and 126 having a like set of bearing members with rollers 133, 134, and 135, respectively, similarly adjustable are located in body 19 adjacent the rear end thereof.

The spindle 23 has three flats extending the length thereof, flat 65 in registration with openings 24 and 124, flat 66 in registration with openings 25 and 125, and flat 67 in registration with openings 26 and 126. The bearing rollers, when adjusted, bear against the flats to hold the spindle securely for axial movement in the body 19. The flat 65 which engages the rollers 33 and 133 lies in a vertical plane, normal to axis D, and the flat 66 which engages rollers 34 and 134 lies in a horizontal plane normal to axis E. The spindle 23 has a central bore 68 in its forward end, which receives a rod or taper with a pointed forward end to define the workpiece engaging tailstock center 16 lying on axis B which is the central axis of the spindle 23. It will be evident that adjustment of the set screw 47, which selectively positions roller 33, permits shifting of the spindle horizontally, and adjustment of set screw 55, which selectively positions roller 34, will permit vertical shifting thereof, and that roller 35, when the bearing member 29 is not engaged by screw 60 and is free to move in opening 26, will adjust itself to accommodate the positioning of the spindle 23 by the adjustment of the other rollers. Thus, by adjustment of both sets of rollers, the axis B of spindle 23 can be selectively shifted laterally in any direction in the plane normal to axis A and can, accordingly, be adjusted to coincide with axis A. It will be noted that adjustment in either the vertical or horizontal direction can be accomplished by adjustment of a single roller in each set.

Spindle 23 is movable axially between limits relative to body 19 to permit clamping and releasing of workpieces between the centers while the tailstock 18 is clamped on the ways. A recess 70 in the body 19 extends under and communicates with bore 22. A vertical bore 71 in body 19 extends between recess 70 and the top of the body, and a shaft 72, carried in roller bearings 73 and 74 separated by spacer 75, is rotatably received therein. A lever 76 is pinned to shaft 72 at 77 above the body 19, and a block 78 is keyed at 79 to the lower end of the shaft in recess 70. Spaced from shaft 72, a member 80 is pivotally connected at 81 to block 78 and is received in a slot 82 in spindle 23. The lever 76, shaft 72, and block 78, thereby define a crank engaged with spindle 23 by which the spindle may be moved axially in body 19. Forward movement of the spindle 23 is limited by the engagement of stop screw 83, which is threadedly received in block 78, with the front wall 70a of recess 70. Rearward movement of spindle 23 is limited by engagement of the spindle with a cap 84 secured by bolts 64 to body 19 over the rear end of bore 22. The spindle is normally urged forward into engagement with a workpiece by spring 85 received in the rear end of the spindle. The spring is engaged with a plug 87 threadedly received in cap 84 adjustable axially relative thereto for alteration of the force with which the spindle is urged forwardly.

The mechanism inside the body 19 is lubricated through passages 90. The forward end of bore 22 is sealed by expandable sleeve 91 connected between the body 19 and spindle 23, and the recess 70 is sealed by bottom plate 92.

If, because of wear on the tailstock, the axis B of spindle 23 on which the center 16 lies is below axis A on which the headstock center lies, or, if because of inaccuracy in the manufacture of the tailstock, axis B is either above or below axis A, rollers 34 and 134 can be moved by adjustment of the appropriate set screws to bring the axis B to the same height as axis A. Similarly, if, because of wear or inaccuracy in manufacture, axis B is to one side or the other of axis A, rollers 33 and 133 can be adjusted by the appropriate set screws until the axes are in proper alignment. If the set screw 60 is out of engagement with bearing member 29, and the corresponding set screw of the other set of bearing members is out of engagement with its associated bearing member, rollers 35 and 135 will position themselves in accordance with the settings of rollers 33 and 34, and 133 and 134. The set screw 60 and the corresponding set screw of the other set of bearing members may thereafter be brought into engagement with their associated bearing members to hold the spindle more firmly on the selected axis.

It will be noted that the use of rollers provides easy longitudinal movement of the spindle and hence a relatively light spring can be used to effect engagement of the spindle with the workpiece. This reduces deformation of the workpiece, particularly a small workpiece, resulting from the clamping force exerted by the spring and permits more accurate grinding of the workpiece. It will also be noted that by spring loading one of the rollers the spindle is always firmly held by the rollers even though wear might occur in the pins on which the rollers are mounted.

What is claimed is:

1. In a machine tool having a headstock with means defining a workpiece support on an axis and having ways extending parallel to said axis, a tailstock comprising a body slidably mounted on the ways and having an elongated cavity therein extending parallel to the ways and opposite the headstock workpiece support, the body having at least three openings spaced around said cavity and in communication therewith, an elongated spindle having a cross-section smaller than the cross-section of said cavity and loosely received therein for movement laterally in all directions within said cavity, means supported by the spindle and extending outside the housing to define a workpiece engaging center, bearing members received in said openings and extending into said cavity to engage the spindle, the bearing members being movable in said openings for adjusting movement of the spindle laterally within the cavity, and means to adjustably position at least two of said bearing members in said openings in selected positions to hold the spindle on a selected axis coincident with the axis of the headstock workpiece support.

2. In a machine tool having a headstock with means defining a workpiece support on an axis and having ways extending parallel to said axis, a tailstock comprising a body slidably mounted on the ways and having a bore therein extending parallel to the ways and opposite the headstock workpiece support, the body having three openings spaced around the circumference of said bore in communication therewith, an elongated spindle having a cross-section smaller than the cross-section of said bore and loosely received therein for movement laterally in all directions within said bore, the spindle having a central bore and flats on the surface thereof in registration with the body openings, a rod received in said spindle bore and having a pointed end extending outside the housing to define a workpiece engaging center, members received in the body openings having rollers at their inner ends extending into said bore to engage the spindle on the flats, said members being movable radially relative to the bore for adjusting movement of the spindle laterally within the body bore, means to adjustably position at least two of said members in said openings in selected positions to hold the spindle for axial movement on a selected axis coincident with the headstock workpiece support axis, and means to move said spindle axially for engagement and disengagement of the tailstock center and the workpiece.

3. In a machine tool having a headstock with a workpiece supporting center on an axis and having ways extending parallel to said axis, a tailstock comprising a body slidably mounted on the ways and having a bore therein extending parallel to the ways and opposite the headstock center, the body having three openings spaced around the circumference of said bore and in communication therewith, an elongated spindle having a cross-section smaller than the cross-section of said bore and loosely received therein for movement laterally in all directions within said bore, the spindle having a central bore and flats on the surface thereof in registration with the body openings, a rod received in said spindle bore and having a pointed end extending outside the housing to define a workpiece engaging center, members received in the body openings having rollers at their inner ends extending into said bore to engage the spindle on the flats, said members being movable radially relative to the bore for adjusting movement of the spindle laterally within the body bore, a spring supported in the body and engaged with one of said members to urge the roller thereof yieldingly into contact with the spindle, means including screws threadedly engaged with the body to move adjustably said other members radially to position the spindle for axial movement on a selected axis coincident with the axis of the headstock workpiece supporting center, and means to move said spindle axially for engagement and disengagement of the tailstock center and the workpiece.

4. In a machine tool having a headstock with a workpiece supporting center and having ways extending parallel to said axis, a tailstock comprising in combination: a body slidably mounted on the ways and having a bore therein extending parallel to the ways and opposite the headstock center, the body having at least two sets of three openings, the sets being spaced longitudinally along the bore and the openings of each set being spaced circumferentially around the bore and in communication therewith, two of said openings of each set being spaced ninety degrees apart and the other opening being opposite said two openings; an elongated spindle having a cross-section smaller than the cross-section of said bore and loosely received therein for movement laterally in all directions within said bore, the spindle having a central bore and flats on the surface thereof in registration with the body openings, the flats in registration with said two openings lying in planes ninety degrees apart, a rod received in said spindle bore and having a pointed end extending outside the housing to define a workpiece engaging center; members received in the body openings having rollers at their inner ends extending into said bore to engage the spindle on the flats, said members being movable radially relative to the bore for adjusting movement of the spindle laterally within the body bore; a spring supported in the body and engaged with the member in said other opening of each set to urge the roller thereof yieldingly into contact with the spindle; means including screws threadedly engaged with the body to move adjustably the members in said two openings radially to position the spindle for axial movement on a selected axis coincident with the axis of the headstock workpiece supporting center; and means to move said spindle axially for engagement and disengagement of the tailstock center and the workpiece.

5. In a machine tool having a headstock with a workpiece supporting center on a horizontal axis and having ways extending parallel to said axis, a tailstock comprising in combination: a body slidably mounted on the ways and having a bore therein extending parallel to the ways and opposite the headstock center, the body having at least two sets of three openings, the sets being spaced longitudinally along the bore and the openings of each set being spaced circumferentially around the bore and in communication therewith, the first and second of said openings of each set being on the vertical and horizontal axes of the bore, respectively, and the other opening being opposite said first and second openings; an elongated spindle having a cross-section smaller than the cross-section of said bore and loosely received therein for movement laterally in all directions within said bore, the spindle having a central bore and flats on the surface thereof in registration with the body openings, the flats in registration with the first and second openings being normal to the vertical and horizontal axes of the bore, respectively; a taper received in said spindle bore and having a pointed end extending outside the housing to define a workpiece engaging center; members received in the body openings having rollers at their inner ends extending into said bore to engage the spindle on the flats, said members being movable radially relative to the bore for adjusting movement of the spindle laterally within the body bore; a spring supported in the body and engaged with the member in said other opening of each set to urge the roller thereof yieldingly into contact with the spindle; means including screws threadedly engaged with the body to move adjustably the members in the first and second openings radially to position the spindle for axial movement on a selected axis coincident with the axis of the headstock workpiece supporting center; means to lock said members in the first and second openings in adjusted position; and means to move said spindle axially for engagement and disengagement of the tailstock center and the workpiece.

References Cited in the file of this patent
UNITED STATES PATENTS 2,002,971    Zimmerman _____ May 28, 1935